US012791356B2

(12) United States Patent
Kim et al.

(10) Patent No.: US 12,791,356 B2
(45) Date of Patent: Nov. 10, 2026

(54) METHOD AND APPARATUS FOR GENERATING HIGH DEFINITION MAP FOR AUTONOMOUS DRIVING CONTROL OF VEHICLE, AND RECORDING MEDIUM STORING COMPUTER PROGRAM THEREFOR

(71) Applicant: RideFlux Inc., Jeju-si (KR)

(72) Inventors: Jihun Kim, Gwangmyeong-si (KR); Sohyun Kim, Seoul (KR); Namgi Kim, Jeju-si (KR)

(73) Assignee: RideFlux Inc., Jeju-si (KR)

( * ) Notice: Subject to any disclaimer, the term of this patent is extended or adjusted under 35 U.S.C. 154(b) by 286 days.

(21) Appl. No.: 18/163,710

(22) Filed: Feb. 2, 2023

(65) Prior Publication Data

US 2023/0384122 A1 Nov. 30, 2023

(30) Foreign Application Priority Data

May 27, 2022 (KR) ........................ 10-2022-0065359

(51) Int. Cl.
*G01C 21/00* (2006.01)
*B60W 60/00* (2020.01)

(52) U.S. Cl.
CPC ....... *G01C 21/3889* (2020.08); *B60W 60/001* (2020.02); *G01C 21/3815* (2020.08); *B60W 2556/40* (2020.02)

(58) Field of Classification Search
CPC . G06F 16/2365; G01C 21/38; G01C 21/3815; G01C 21/3859; G01C 21/3878; G01C 21/3804; G01C 21/3848; G01C 21/3833; G01C 21/3852
See application file for complete search history.

(56) References Cited

U.S. PATENT DOCUMENTS

2010/0057352 A1* 3/2010 Nakae .................... G01C 21/32 701/532
2021/0063200 A1* 3/2021 Kroepfl .............. G01C 21/3811

FOREIGN PATENT DOCUMENTS

| | | | |
|---|---|---|---|
| JP | 6417987 | B2 | 11/2018 |
| JP | 6749113 | B2 | 9/2020 |
| KR | 10-2019-0109625 | A | 9/2019 |
| KR | 10-2020-0034529 | A | 3/2020 |
| KR | 10-2021-0150805 | A | 12/2021 |

* cited by examiner

*Primary Examiner* — Benyam Haile
(74) *Attorney, Agent, or Firm* — Studebaker Brackett PLLC

(57) ABSTRACT

Provided are a method and apparatus for generating a high definition map for autonomous driving control of a vehicle, and a recording medium on which a computer program therefor is recorded. A method of generating a high definition map for autonomous driving control of a vehicle according to various embodiments of the present disclosure is performed by a computing device, and includes selecting one or more map layers for a predetermined area, and generating high definition map data corresponding to the area using the selected one or more map layers, wherein the generating of the high definition map data includes verifying the compatibility of the selected one or more map layers.

12 Claims, 8 Drawing Sheets

FIG. 11

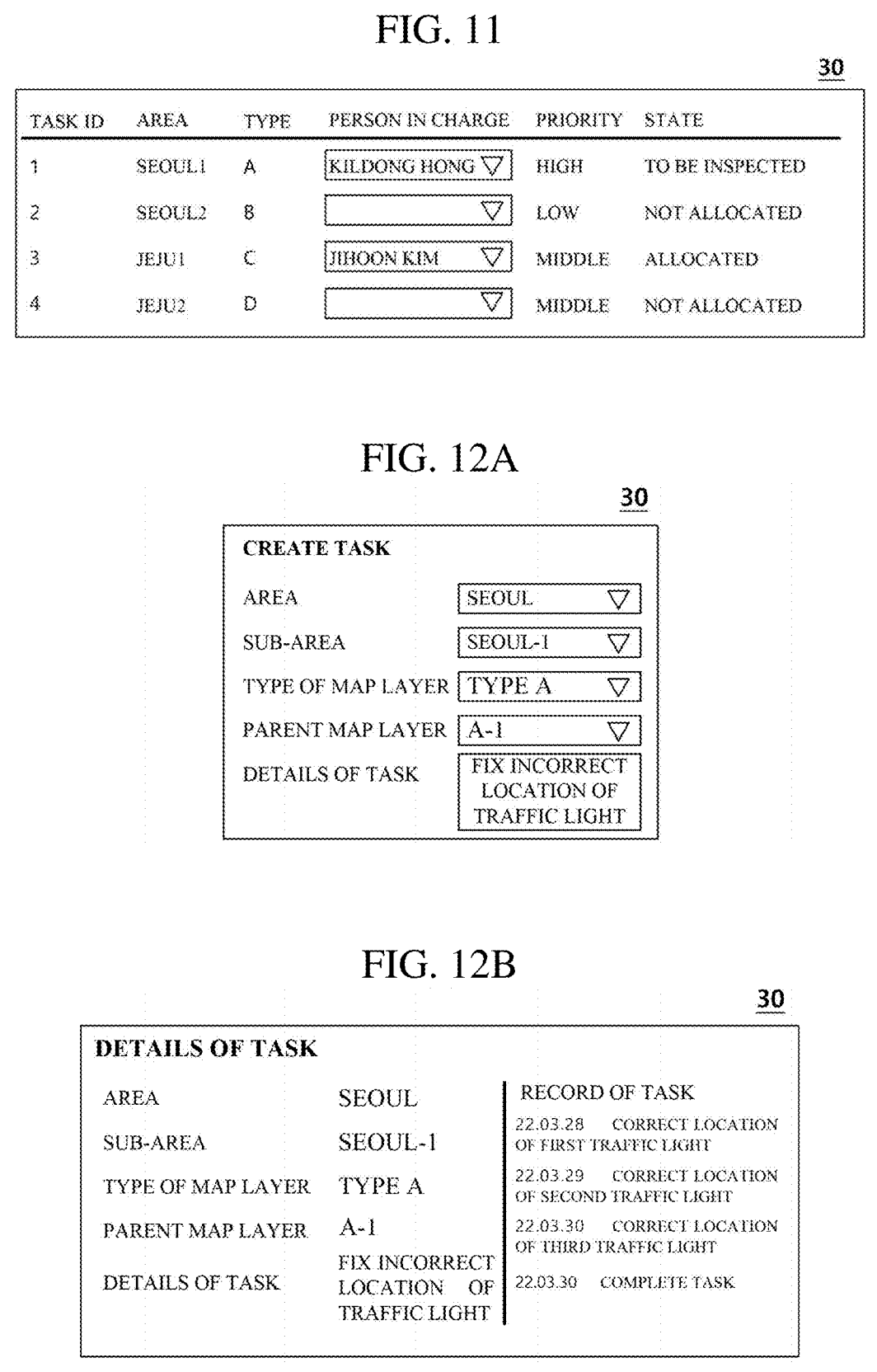

30

| TASK ID | AREA | TYPE | PERSON IN CHARGE | PRIORITY | STATE |
|---|---|---|---|---|---|
| 1 | SEOUL1 | A | KILDONG HONG ▽ | HIGH | TO BE INSPECTED |
| 2 | SEOUL2 | B | ▽ | LOW | NOT ALLOCATED |
| 3 | JEJU1 | C | JIHOON KIM ▽ | MIDDLE | ALLOCATED |
| 4 | JEJU2 | D | ▽ | MIDDLE | NOT ALLOCATED |

FIG. 12A

30

CREATE TASK

| | |
|---|---|
| AREA | SEOUL ▽ |
| SUB-AREA | SEOUL-1 ▽ |
| TYPE OF MAP LAYER | TYPE A ▽ |
| PARENT MAP LAYER | A-1 ▽ |
| DETAILS OF TASK | FIX INCORRECT LOCATION OF TRAFFIC LIGHT |

FIG. 12B

30

DETAILS OF TASK

| | |
|---|---|
| AREA | SEOUL |
| SUB-AREA | SEOUL-1 |
| TYPE OF MAP LAYER | TYPE A |
| PARENT MAP LAYER | A-1 |
| DETAILS OF TASK | FIX INCORRECT LOCATION OF TRAFFIC LIGHT |

RECORD OF TASK 22.03.28 CORRECT LOCATION OF FIRST TRAFFIC LIGHT 22.03.29 CORRECT LOCATION OF SECOND TRAFFIC LIGHT 22.03.30 CORRECT LOCATION OF THIRD TRAFFIC LIGHT 22.03.30 COMPLETE TASK

METHOD AND APPARATUS FOR GENERATING HIGH DEFINITION MAP FOR AUTONOMOUS DRIVING CONTROL OF VEHICLE, AND RECORDING MEDIUM STORING COMPUTER PROGRAM THEREFOR

CROSS-REFERENCE TO RELATED APPLICATION

This application claims priority to and the benefit of Korean Patent Application No. 10-2022-0065359, filed on May 27, 2022, the disclosure of which is incorporated herein by reference in its entirety.

BACKGROUND

1. Field of the Invention

Various embodiments of the present disclosure relate to a method, apparatus and a computer program for generating a high definition map for autonomous driving control of a vehicle.

2. Discussion of Related Art

There is a trend of equipping vehicles with various types of sensors and electronic devices (e.g., advanced driver assistance system (ADAS)) for convenience of users driving vehicles, and particularly, technologies for an autonomous driving system of an autonomous vehicle capable of recognizing a surrounding environment without a driver's intervention and automatically driving to a given destination according to the recognized surrounding environment are being actively developed.

Here, the autonomous vehicle is a vehicle equipped with an autonomous driving system function for recognizing a surrounding environment without a driver's intervention and automatically driving to a given destination according to the recognized surrounding environment.

In order to control the driving behavior of an autonomous vehicle without a driver's intervention, a process of recognizing a surrounding environment of the autonomous vehicle is necessary, and in particular, a high definition map is essential to ensure the safety and reliability of fully autonomous driving, and the importance of a high definition map is significantly growing.

A high definition map may include various types of map layers including different prior information according to usage. For example, the high definition map may include a map layer including lane information, a map layer including traffic light location information, a map layer including static object information, and the like. Each map layer of the high definition map may be generated from sensor data.

For example, data may be collected as a vehicle having sensors, such as a light wave detection and ranging (LiDAR) sensor, a radio detecting and ranging (radar) sensor, a camera, and a global positioning system (GPS), scans the road and a surrounding environment to collect data, and processes and corrects the collected data to generate map layers.

Conventionally, a user is provided with an environment for the generation of a high definition map, and generates multiple map layers by processing sensor data directly in the environment and combines the multiple map layers to obtain a high definition map.

Meanwhile, because the road and a surrounding environment may change over time (e.g., due to the formation of a new road, the closure of the road due to construction, a terrain change, or the like), map layers generated from the same version of sensor data (e.g., pieces of sensor data that are the same in terms of collection time, the type of sensor, the type of data, etc.) for the same area are preferably included to generate a more high definition map. However, in the conventional method, only an environment in which a user can generate a high definition map more conveniently is provided, and human errors, e.g., use of map layers generated from different versions of sensor data, cannot be prevented. Therefore, it is difficult to build a high definition map, thus causing an error of an autonomous driving system or decreasing autonomous driving safety.

SUMMARY OF THE INVENTION

The present disclosure is directed to providing a method, an apparatus, and a computer program for generating a high definition map for autonomous driving control of a vehicle, in which an environment in which a user can generate high definition map data for a predetermined area more conveniently is provided, and a function of verifying the compatibility of a map layer selected by the user is provided to prevent human errors, e.g., use of map layers generated from different versions of sensor data, thereby enabling the generation of a more high definition map.

Aspects of the present disclosure are not limited thereto and other aspects that are not mentioned herein will be apparent to those of ordinary skill in the art from the following description.

According to an aspect of the present disclosure, a method of generating a high definition map for autonomous driving control of a vehicle, which is performed by a computing device, includes selecting one or more map layers for a predetermined area, and generating high definition map data corresponding to the predetermined area using the selected one or more map layers, and the generating of the high definition map data includes verifying the compatibility of the selected one or more map layers.

In various embodiments, the verifying of the compatibility of the selected one or more map layers may include generating a plurality of pieces of first unique identification information corresponding to previously generated map layers on the basis of attributes of the previously generated map layers, and generating relationship information between the plurality of pieces of first unique identification information on the basis of a correlation between the previously generated map layers; and when a first map layer is selected for the predetermined area, determining a relationship between first unique identification information of the selected first map layer and first unique identification information of a second map layer on the basis of the generated relationship information, and determining compatibility between the selected first map layer and the second map layer on the basis of the determined relationship, wherein the second map layer is a map layer selected together with the first map layer or a map layer included in high definition map data corresponding to the predetermined area.

In various embodiments, the verifying of the compatibility of the selected one or more map layers may include generating a plurality of pieces of second unique identification information corresponding to a plurality of pieces of sensor data on the basis of attributes of the plurality of pieces of sensor data, and matching the generated pieces of second unique identification information and a plurality of map layers generated from the plurality of pieces of sensor data; and when a first map layer is selected for the predetermined area, comparing second unique identification information of the selected first map layer with second unique identification information of a second map layer to determine compatibility between the selected first map layer and the second map layer, wherein the second map layer is a map layer selected together with the first map layer or a map layer included in high definition map data corresponding to the predetermined area.

In various embodiments, the verifying of the compatibility of the selected one or more map layers may include, when a plurality of map layers are selected for the predetermined area, determining attributes of the selected map layers on the basis of information included in the selected map layers, determining whether there are two or more map layers having the same attribute among the selected map layers, based on the determined attributes, and determining the selected map layers to be mutually compatible when it is determined that there are no two or more map layers having the same attribute among the selected map layers or that the two or more map layers determined to have the same attribute are identical to each other, and determining the selected map layers to be mutually incompatible when the two or more map layers having the same attribute are different map layers.

In various embodiments, the predetermined area may include a first zone and a second zone adjacent to the first zone, and the verifying of the compatibility of the selected one or more map layers may include, when a first map layer is selected for the first zone, setting a compatibility determination condition on the basis of an attribute of information included in the selected first map layer, and determining whether the selected first map layer and a second map layer satisfy the set compatibility determination condition, wherein the second map layer may include the same information as the information included in the selected first map layer among a plurality of second map layers included in high definition map data corresponding to the second zone.

In various embodiments, the determining of whether the selected first map layer and the second map layer satisfy the set compatibility determination condition may include setting road continuity as the compatibility determination condition when the selected first map layer includes road information, determining whether a road is continuous at a boundary between the first zone and the second zone on the basis of the road information included in the selected first map layer and road information included in the second map layer, and determining the first map layer to be a compatible map layer when it is determined that the road is continuous at the boundary between the first and second zones, and determining the first map layer to be an incompatible map layer when it is determined that the road is not continuous at the boundary between the first and second zones.

In various embodiments, the determining of whether the first map layer and the second map layer satisfy the set compatibility determination condition may include setting whether a traffic light is duplicated as the compatibility determination condition when the selected first map layer includes traffic light location information, determining whether the same traffic light is present in the first and second zones on the basis of the traffic light location information included in the selected first map layer and traffic light location information included in the second map layer, and determining the first map layer to be a compatible map layer when it is determined that the same traffic light is not present in the first and second zones, and determining the first map layer to be an incompatible map layer when it is determined that the same traffic light is present in the first and second zones.

In various embodiments, the verifying of the compatibility of the selected one or more map layers may include, when it is determined that the selected one or more map layers are determined to be compatible map layers, adding the selected one or more map layers to high definition map data for the predetermined area; and when it is determined that the selected one or more map layers are determined to be incompatible map layers, recommending at least one compatible map layer on the basis of an attribute of a map layer included in the high definition map data corresponding to the predetermined area.

In various embodiments, the selecting of the one or more map layers may include providing a user interface (UI), and selecting one or more map layers from among the plurality of map layers through the provided UI, wherein the plurality of map layers are generated by post-processing a plurality of pieces of sensor data collected in correspondence with the predetermined area, and the provided UI may include a first UI providing information about a build status of high definition map data corresponding to the predetermined area, and a second UI providing a build environment of the high definition map data corresponding to the predetermined area.

In various embodiments, the first UI may include an area selection field for outputting information about the predetermined area, a high definition map status display field for outputting a build status of high definition map data corresponding to each of a plurality of zones of the predetermined area, and a map layer display field for outputting information about map layers included in the high definition map data corresponding to each of the plurality of zones, and the providing of the UI may include, when one of the plurality of zones is selected through the high definition map status display field, highlighting the zone selected from among the plurality of zones output to the high definition map status display field, and outputting information about map layers included in high definition map data corresponding to the selected zone through the map layer display field.

In various embodiments, the second UI may include a map layer selection field for outputting information about the plurality of map layers, a high definition map information field for outputting information about high definition map data corresponding to each of a plurality of zones of the predetermined area, and a compatibility display field for displaying a result of verifying compatibility between map layers, and the providing of the UI may include, when at least one map layer is selected from among the plurality of map layers through the map layer selection field, adding the selected at least one map layer to the high definition map data, outputting the high definition map data added the selected at least one map layer through the high definition map information field, verifying compatibility of the selected at least one map layer, and outputting a result of verifying the compatibility of the selected at least one map layer through the compatibility display field.

In various embodiments, the method may further include generating a plurality of map layers for the predetermined area, and the generating of the plurality of map layers may include generating an upper map layer for the predetermined area on the basis of a user input, and automatically generating one or more lower map layers for the generated upper map layer according to a predefined rule using the generated upper map layer.

According to another aspect of the present disclosure, a computing device for performing a method of generating a high definition map for autonomous driving control of a vehicle includes a processor, a network interface, a memory, and a computer program that is loaded in the memory and is executable by the processor, the computer program includes an instruction for selecting one or more map layers for a predetermined area, and an instruction for generating high definition map data corresponding to the predetermined area using the selected one or more map layers, and the instruction for generating the high definition map data includes an instruction for verifying compatibility of the selected one or more map layers.

According to another aspect of the present disclosure, there is provided a computer-readable recording medium on which a program for executing a method of generating a high definition map for autonomous driving control of a vehicle in conjunction with a computing device is recorded, in which the method includes selecting one or more map layers for a predetermined area, and generating high definition map data corresponding to the predetermined area using the selected one or more map layers, and the generating of the high definition map data includes verifying compatibility of the selected one or more map layers.

Other aspects of the present disclosure will be apparent from the detailed description and drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 9 to 14 are diagrams illustrating examples of a user interface (UI) applicable to various embodiments.

DETAILED DESCRIPTION OF EXEMPLARY EMBODIMENTS

Figure 1:
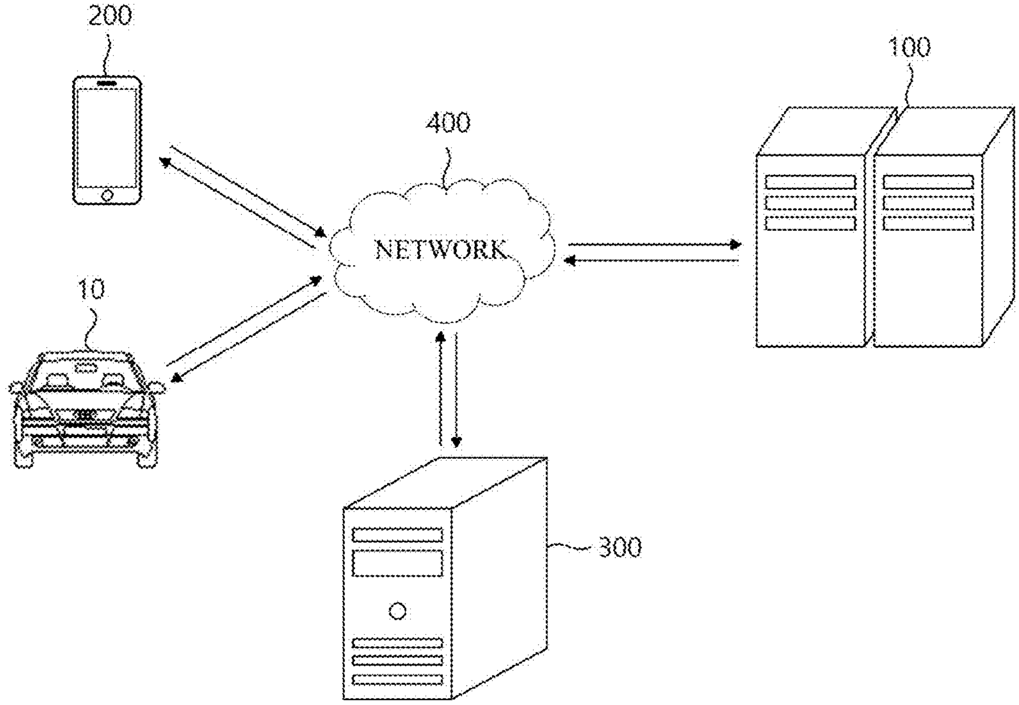
FIG. 1 is a diagram illustrating an autonomous driving system according to an embodiment of the present disclosure.

Advantages and features of the present disclosure and methods of achieving them will be apparent from embodiments described in detail, in conjunction with the accompanying drawings. However, the present disclosure is not limited to embodiments set forth herein and may be embodied in many different forms. The embodiments are merely provided so that this disclosure will be thorough and complete and will fully convey the scope of the present disclosure to those of ordinary skill in the art. The present disclosure should be defined by the claims.

Terms used herein are for the purpose of describing embodiments only and are not intended to be limiting of the present disclosure. As used herein, singular forms are intended to include plural forms unless the context clearly indicates otherwise. As used herein, the terms "comprise" and/or "comprising" specify the presence of stated components but do not preclude the presence or addition of one or more other components. Throughout the present disclosure, like reference numerals refer to like elements, and "and/or" includes each and all combinations of one or more of the mentioned components.

As used herein, "first," "second," etc. are used to describe various components, these components are not limited by these terms. These terms are only used to distinguish one component from another. Therefore, a first component discussed below could be termed a second component without departing from the technical scope of the present disclosure. For example, the terms "first map layer" and "second map layer" may be used herein to distinguish between two different map layers.

Unless otherwise defined, all terms (including technical and scientific terms) used herein have the same meaning as commonly understood by one of ordinary skill in the art to the present disclosure pertains. Terms, such as those defined in commonly used dictionaries, will not be interpreted in an idealized or overly formal sense unless explicitly defined herein.

The term "unit" or "module" used herein should be understood as software or a hardware component, such as a field programmable gate array (FPGA) or an application specific integrated circuit (ASIC), which performs certain functions. However, the term "unit" or "module" is not limited to software or hardware. The term "unit" or "module" may be configured to be stored in an addressable storage medium or to reproduce one or more processors. Thus, the term "unit" or "module" should be understood to include, for example, components, such as software components, object-oriented software components, class components, and task components, processes, functions, attributes, procedures, subroutines, segments of program code, drivers, firmware, microcode, a circuit, data, databases, data structures, tables, arrays, and parameters. Functions provided in components and "units" or "modules" may be combined into smaller numbers of components and "units" or "modules" or divided into subcomponents and "subunits" or "submodules."

Spatially relative terms, such as "below," "beneath," "lower," "above," "upper" and the like, may be used herein for ease of description of the relationship between one element and other elements as illustrated in the drawings. Spatially relative terms are intended to encompass different orientations of components in use or operation, in addition to the orientations depicted in the drawings. For example, when one component illustrated in each of the drawings is turned upside down, another component referred to as "below" or "beneath" the component may be located "above" the component. Thus, the illustrative term "below" should be understood to encompass both an upward direction and a downward direction. Components can be oriented in different directions as well and thus spatially relative terms can be interpreted according to orientation.

As used herein, the term "computer" should be understood to mean various types of hardware devices, including at least one processor, and may be understood to include a software component operating in a corresponding hard device according to an embodiment. For example, a computer may be understood to include, but is not limited to, a smart phone, a tablet PC, a desktop computer, a laptop computer, and a user client and an application running on each device.

Hereinafter, embodiments of the present disclosure will be described in detail with reference to the accompanying drawings.

Operations described herein will be described as being performed by a computer, but the subject of each of the operations is not limited thereto and at least some of the operations may be performed by different devices according to an embodiment.

FIG. 1 is a diagram illustrating an autonomous driving system according to an embodiment of the present disclosure.

Referring to FIG. 1, an autonomous driving system according to the embodiment of the present disclosure may include a computing device 100, a user terminal 200, an external server 300, and a network 400.

Here, the autonomous driving system of FIG. 1 is an example, and the components thereof are not limited to the embodiment of FIG. 1 and may be added, changed, or removed as necessary.

In an embodiment, the computing device 100 may perform autonomous driving control of the vehicle 10 and generate high definition map data required for autonomous driving control of the vehicle 10.

Here, the high definition map data is preferably provided for sub-zones of an area rather than the whole area in consideration of flexibility and convenience in the manufacture and change thereof. Therefore, the computing device 100 may divide a predetermined area into a plurality of zones and individually generate high definition map data for each of the plurality of zones.

In this case, when an area is divided into a plurality of zones on the basis of an actual physical topography, such as mountains or rivers, or administrative district divisions, such as of city, county, or district boundaries, the generality of representation of zones may be hindered and thus an entire area may be divided into a plurality of zones of the same size, i.e., in a grid form, to be applicable regardless of actual classification criteria, but the present disclosure is not limited thereto.

Here, the computing device 100 may be included in the vehicle 10 and implemented to perform only autonomous driving control of the vehicle 10 but is not limited thereto. In some cases, the computing device 100 may be a central server provided separately outside the vehicle 10 and be implemented to perform autonomous driving control of all vehicles that are in a predetermined area.

In various embodiments, the computing device 100 may provide an environment for generating a high definition map for a predetermined area. For example, the computing device 100 may be connected to the user terminal 200 through the network 400, provide a web- or application-based high definition map generation service to the user terminal 200, provide a user interface (UI) for generation of a high definition map (e.g., a first UI 20 and a second UI 30 illustrated in FIGS. 9 to 14) as a user executes the high definition map generation service through the user terminal 200, and generate high definition map data on the basis of a user input (e.g., a user input for selecting a specific area, a user input for selecting a map layer, or the like) obtained through the UI.

Here, the user terminal 200 may include an operating system for running a high definition map generation service provided in the form of web or application, and a display for outputting a UI provided as the high definition map generation service is executed. Examples of the user terminal 200 may include, but are not limited to, a navigation system, a personal communication system (PCS), a global system for mobile communications (GSM), a personal digital cellular (PDC), a personal handy phone system (PHS), a personal digital assistant (PDA), International Mobile Telecommunications (IMT)-2000, code division multiple access (CDMA)-2000, W-CDMA, a wireless broadband Internet (WiBro) terminal, a smart phone, a smart pad, and a tablet PC.

Here, the network 400 may be a connection structure for the exchange of information between nodes such as terminals and servers. Examples of the network 400 may include a local area network (LAN), a wide area network (WAN), the World Wide Web (WWW), a wired/wireless data communication network, a telephone network, a wired/wireless television communication network, etc.

Examples of the wireless data communication network include, but are not limited to, 3G, 4G, 5G, 3$^{rd}$ generation partnership project (3GPP), 5$^{th}$ generation partnership project (5GPP), long-term evolution (LTE), world interoperability for microwave access (WiMAX), Wi-Fi, the Internet, a LAN, a wireless LAN, a WAN, a personal area network (PAN), radio frequency (RF), a Bluetooth network, a near-field communication (NFC) network, a satellite broadcast network, an analog broadcast network, a digital multimedia broadcasting (DMB) network, etc.

In an embodiment, the external server 300 may be connected to the computing device 100 through the network 400, and may store and manage various types of information and data (e.g., sensor data, a plurality of map layers, etc.) necessary for the computing device 100 to perform a method of generating a high definition map for autonomous driving control of a vehicle or receive various types of information and data (e.g., high definition map data, etc.), which are generated as the method of generating a high definition map for autonomous driving control of a vehicle is performed from the computing device 100 and store and manage the received information and data. For example, the external server 300 may be a storage server provided separately outside the computing device 100 but is not limited thereto. A hardware configuration of the computing device 100 for performing the method of generating a high definition map for autonomous driving control of a vehicle will be described with reference to FIG. 2 below.

Figure 2:
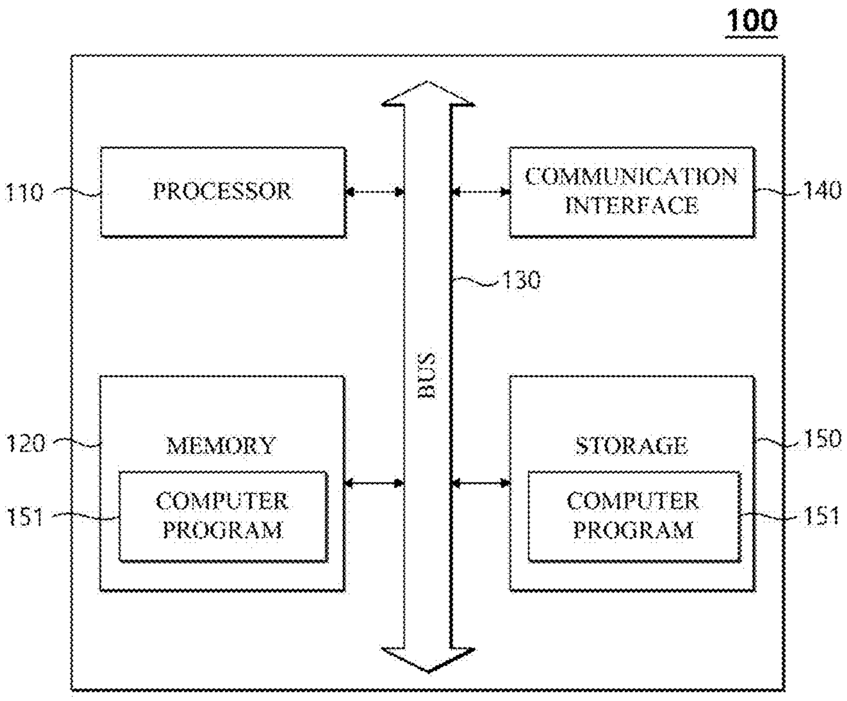
FIG. 2 is a diagram illustrating a hardware configuration of a computing device that performs a method of generating a high definition map for autonomous driving control of a vehicle according to another embodiment of the present disclosure.

FIG. 2 is a diagram illustrating a hardware configuration of a computing device that performs a method of generating a high definition map for autonomous driving control of a vehicle according to another embodiment of the present disclosure.

Referring to FIG. 2, according to various embodiments, the computing device 100 may include one or more processors 110, a memory 120 in which a computer program 151 executable by the processor 110 is loaded, a bus 130, a communication interface 140, and a storage 150 storing the computer program 151. Here, FIG. 2 illustrates only components related to the embodiment of the present disclosure. Therefore, it will be apparent to those of ordinary skill in the art that other general-purpose components may be further provided as well as the components illustrated in FIG. 2.

The processor 110 controls overall operations of the components of the computing device 100. The processor 110 may include a central processing unit (CPU), a microprocessor unit (MPU), a microcontroller unit (MCU), a graphics processing unit (GPU), or any type of processor well known in the technical field of the present disclosure.

The processor 110 may perform an operation on at least one application or program for performing methods according to embodiments of the present disclosure, and the computing device 100 may include one or more processors.

In various embodiments, the processor 110 may further include a random access memory (RAM) (not shown) and a read-only memory (ROM) (not shown) for temporarily and/or permanently storing signals (or data) processed in the processor 110. The processor 110 may take the form of a system-on-chip (SoC) including at least one of a GPU, a RAM, and a ROM.

The memory 120 stores various types of data, instructions, and/or information. The memory 120 may load the computer program 151 from the storage 150 to perform methods/operations according to various embodiments of the present disclosure. When the computer program 151 is loaded in the memory 120, the processor 110 may execute one or more instructions constituting the computer program 151 to perform the methods/operations. The memory 120 may be embodied as a volatile memory such as a RAM but the technical scope of the present disclosure is not limited thereto.

The bus 130 provides a communication function between the components of the computing device 100. The bus 130 may be embodied as a various types of buses such as an address bus, a data bus, and a control bus.

The communication interface 140 supports wired/wireless Internet communication of the computing device 100. The communication interface 140 may support various communication methods in addition to Internet communication. To this end, the communication interface 140 may include a communication module well known in the technical field of the present disclosure. In some embodiments, the communication interface 140 may be omitted.

The storage 150 may store the computer program 151 non-temporarily. When a process of generating a high definition map for autonomous driving control of a vehicle is performed through the computing device 100, the storage 150 may store various types of information required to provide this process.

The storage 150 may include a non-volatile memory, such as a ROM, an erasable programmable ROM (EPROM), an electrically erasable programmable ROM (EEPROM) or a flash memory, a hard disk, a detachable disk, or any type of computer-readable recording medium well known in the technical field to which the present disclosure pertains.

The computer program 151 may include one or more instructions causing the processor 110 to perform a method/operations according to various embodiments of the present disclosure when the computer program 151 is loaded in the memory 120. That is, the processor 110 may execute the one or more instructions for performing the method/operations according to various embodiments of the present disclosure.

In an embodiment, the computer program 151 may include one or more instructions for performing a method of generating a high definition map for autonomous driving control of a vehicle, the method including selecting one or more map layers for a predetermined area, generating high definition map data corresponding to the area using the selected one or more map layers, and verifying the compatibility of the selected one or more map layers.

The operations of the method or an algorithm described above in connection with embodiments of the present disclosure may be implemented directly by hardware, a software module executed by hardware, or a combination thereof. The software module may reside in a RAM, a ROM, an EPROM, an EEPROM, a flash memory, a hard disk, a removable disk, a CD-ROM, or any type of computer-readable recording medium well-known in the technical field to which the present disclosure pertains.

Components of the present disclosure may be embodied in the form of a program (or an application) and stored in a medium to be executed in combination with a computer which is hardware. The components of the present disclosure may be implemented by software programming or software elements, and similarly, embodiments may be implemented in a programming or scripting language such as C, C++, Java, or an assembler, including data structures, processes, routines, or various algorithms which are combinations of other programming constructs. Functional aspects may be embodied as an algorithm executable by one or more processors. A method of generating a high definition map for autonomous driving control of a vehicle, performed by a computing device 100 will be described with reference to FIGS. 3 to 7 below.

Figure 3:
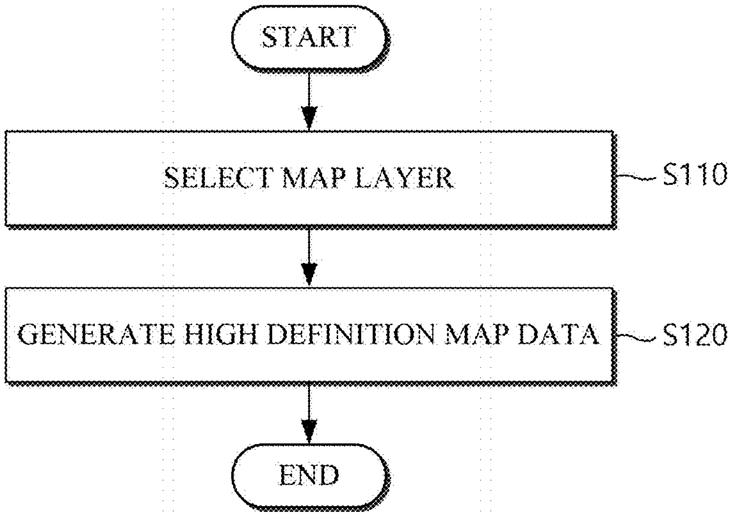
FIG. 3 is a flowchart of a method of generating a high definition map for autonomous driving control of a vehicle according to another embodiment of the present disclosure.

FIG. 3 is a flowchart of a method of generating a high definition map for autonomous driving control of a vehicle according to another embodiment of the present disclosure.

Referring to FIG. 3, in operation S110, the computing device 100 may select one or more map layers for a predetermined area.

According to various embodiments, the computing device 100 may be connected to the user terminal 200 through the network 400 to provide a UI for generating a high definition map to the user terminal 200 and allow a user to select one or more map layers from among a plurality of map layers through the UI. To this end, the computing device 100 may perform generating a plurality of map layers for a predetermined area in advance.

Here, the plurality of map layers for the area may be generated by post-processing sensor data (e.g., point cloud data collected through a LiDAR sensor) collected corresponding to the area, but is not limited thereto.

More specifically, the computing device 100 may generate a first map layer by post-processing sensor data collected by scanning a predetermined area through a sensor, generate a second map layer by post-processing the first map layer, generate a third map layer by post-processing the second map layer, and generate fourth to seventh map layers by post-processing the third map layer.

Here, the first to seventh map layers generated based on the sensor data may be divided into an upper map layer (a parent map layer) and lower map layers (child map layers) according to an order. For example, when the second map layer is generated by post-processing the first map layer and the third map layer is generated by post-processing the second map layer, the first map layer may be an upper map layer for the second map layer and the third map layer, the second map layer may be a lower map layer for the first map layer and an upper map layer for the third map layer, and the third map layer may be a lower map layer for the first map layer and the second map layer.

That is, when a new map layer is generated based on sensor data and/or a map layer as described above, the computing device 100 may define a hierarchical relationship between a previously generated map layer and the new map layer and store the new map layer according to the defined hierarchical relationship. For example, the computing device 100 may include a relational DB as illustrated in FIG. 8, and store information about a relationship between the plurality of map layers.

Figure 8:
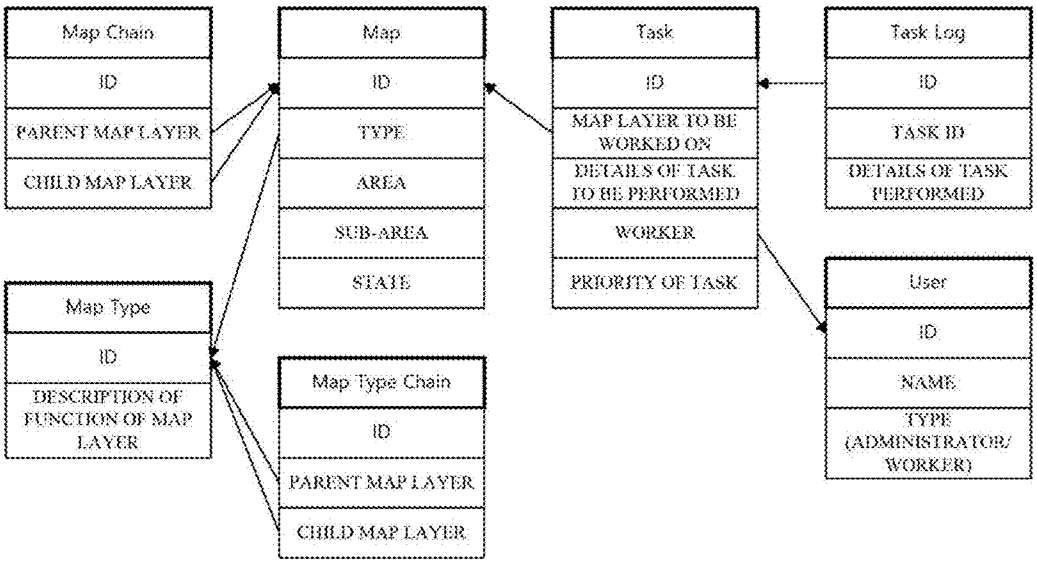
FIG. 8 is a diagram illustrating an example of a structure of a relational database applicable to various embodiments.

Here, referring to FIG. 8, the relational DB may be divided into map-related tables and task-related tables. Among the map-related tables, a MapType table may include information about the type (category) of a map, and a Map table may include meta information about individual map layers. A MapTypeChain table and a MapChain table may each represent a hierarchical relationship (parent-child relationship) at the type level and individual map layer level. Among the task-related tables, a Task table may represent individual tasks and a Task log table may represent a record of each task performed by a worker.

In various embodiments, the computing device 100 may generate a lower map layer for an upper map layer by editing or building the upper map layer.

First, the editing of the upper map layer may be a process of generating a lower map layer by inputting additional information, e.g., labeling the additional information on the upper map layer, and processing or correcting the additional information. For example, when a user selects a certain upper map layer and inputs information to be added to the selected upper map layer to the computing device 100 through a UI, the computing device 100 may edit a lower map layer corresponding to the upper map layer.

Next, the building of the upper map layer may be a process of generating a lower map layer by filtering some information included in the upper map layer or extracting only some information without inputting additional information to the upper map layer. For example, when a user selects a certain upper map layer and selects information to be filtered or extracted from information included in the selected upper map layer through the UI, the computing device 100 may filter the selected information or extract only the selected information to build a lower map layer corresponding to the upper map layer. Alternatively, when a user selects a certain upper map layer through the UI, the computing device 100 may filter or extract only predetermined information (information to be filtered or extracted may be set by the user in advance) from information included in the selected upper map layer to build a lower map layer corresponding to the upper map layer.

In the case of an editing operation, a process of inputting additional information is required to generate a lower map layer and thus a user's direct intervention is required to edit the lower map layer, whereas in case of a building operation, some information included in an upper map layer is filtered or extracted without inputting additional information and thus a lower map layer may be generated without the user's direct intervention.

In consideration of this point, the computing device 100 may provide an auto-build function of automatically building a lower map layer on the basis of the upper map layer, so that one or more lower map layers may be automatically generated from the upper map layer.

More specifically, when an upper map layer is generated based on a user input, the computing device 100 may automatically generate one or more lower map layers according to a predefined rule using the upper map layer.

In this case, when a lower map layer is generated on the basis of an inaccurate upper map layer, because the lower map layer also contains inaccurate information, the safety of high definition map data cannot be ensured when the high definition map data is generated on the basis of such a lower map layer.

In consideration of this point, the computing device 100 may automatically build a lower map layer for an upper map layer in response to ensuring the safety of the upper map layer.

First, the computing device 100 may determine whether the safety of an upper map layer is secured.

For example, it may be determined that the safety of a certain upper map layer is ensured when the inspection of the upper map layer is completed by a user through a UI (e.g., when a check for completion of the inspection of the upper map layer is input).

As another example, when a specific upper map layer is built by a user through a UI, the computing device 100 may determine that the upper map layer has been generated based on a safety-ensured map layer and the safety of the upper map layer is thus ensured.

Thereafter, the computing device 100 may build one or more lower map layers using the upper map layer whose safety is determined to be ensured.

In various embodiments, when it is determined that the safety of a specific upper map layer is ensured, the computing device 100 may select an ungenerated type of lower map layer among a plurality of lower map layers generable from the upper map layer and perform a building operation based on the upper map layer to generate the selected lower map layer.

For example, the computing device 100 may sequentially store information about a plurality of lower map layers generable from a specific upper map layer in an automatic build queue, sequentially extract (pop) the information about the plurality of lower map layers from the automatic build queue from a point in time when the safety of the upper map layer is secured, and generate a plurality of lower map layers from the upper map layer on the basis of the extracted information.

In this case, the computing device 100 may output, through a UI, information about a lower map layer to be generated through an automatic building function, information about an automatically generated lower map layer, and information about a lower map layer that fails to be automatically generated, so that a user may check an automatic build status of map layers through the UI.

In various embodiments, a predetermined area may include a plurality of zones, and the computing device 100 may be provided with one or more selected map layers for each of the plurality of zones and may individually generate high definition map data corresponding to each of the plurality of zones in operation S120 to be described below. However, the present disclosure is not limited thereto, and the computing device 100 may allow a user to select a map layer for a predetermined area and classify the selected map layer as any one of the plurality of zones.

In operation S120, the computing device 100 may generate high definition map data for the area using the one or more map layers selected in operation S110.

In this case, the computing device 100 may verify the compatibility of one or more map layers selected by a user to prevent inaccurate high definition map data from being generated due to human error. A method of verifying the compatibility of a map layer will be described with reference to FIGS. 4 to 7 below.

Figure 4:
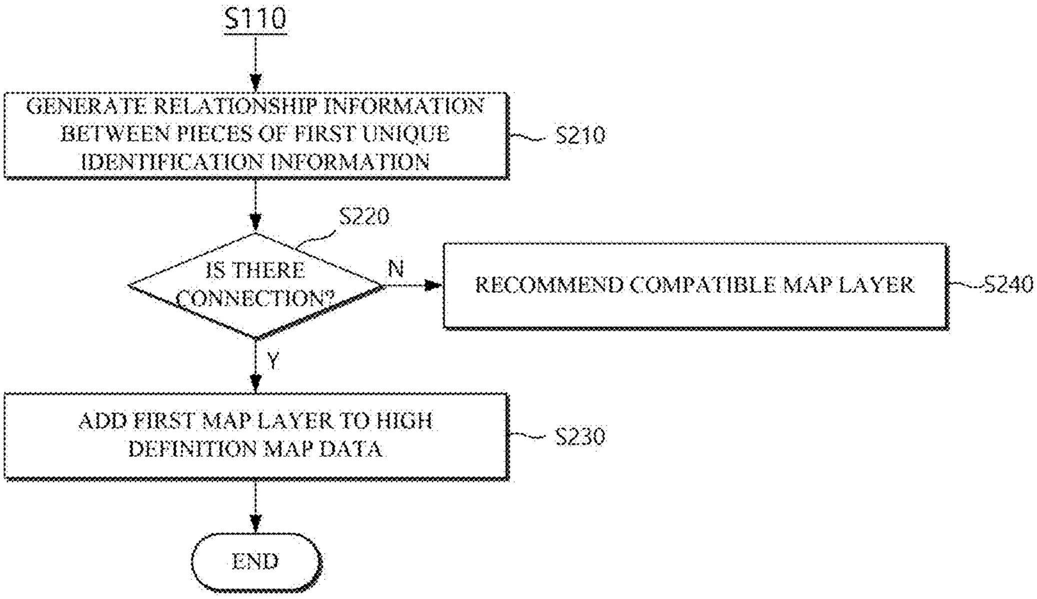
FIG. 4 is a flowchart of a method of verifying the compatibility of map layers on the basis of relationship information between the map layers according to various embodiments.

FIG. 4 is a flowchart of a method of verifying the compatibility of map layers on the basis of relation information between the map layers according to various embodiments.

Referring to FIG. 4, in various embodiments, the computing device 100 may verify the compatibility of a map layer selected by a user on the basis of relationship information between map layers.

In operation S210, the computing device 100 may generate relationship information between pieces of first unique identification information.

More specifically, first, the computing device 100 may generate pieces of first unique identification information corresponding to the map layers on the basis of attributes of the map layers. For example, the computing device 100 may generate first unique identification information of each of the map layers on the basis of at least one of the type of each of the map layers (e.g., a type of information included in each of the map layers), zones corresponding to the map layers (e.g., zones in which sensor data used to generate the plurality of map layers is collected), and a version (e.g., a point in time when the sensor data used to generate the map layers has been collected, the type of a sensor, the type of sensor data, etc.).

Here, each of the pieces of first unique identification information is unique identification (ID) information corresponding to a map layer among the map layers, and may be, for example, a combination of a code (a number or alphabet) corresponding to the type of the map layer, a code corresponding to the zone of the map layer, and a code corresponding to the version of the map layer, but embodiments are not limited thereto.

Thereafter, the computing device 100 may define a relationship between the map layers on the basis of a correlation between the map layers, and generate relationship information between the pieces of first unique identification information corresponding to the map layers according to the defined relationship.

For example, the computing device 100 may divide the map layers into groups on the basis of the types of the map layers, and generate first relationship information about the types by mutually matching the pieces of first unique identification information corresponding to the map layers divided into groups.

The computing device 100 may divide the map layers into groups on the basis of the zones corresponding to the map layers and may generate second relationship information about the zones by mutually matching the pieces of first unique identification information corresponding to the map layers divided into groups.

In addition, the computing device 100 may divide the map layers into groups on the basis of the version of each of the map layers and generate third relationship information about the versions by mutually matching the pieces of first unique identification information corresponding to the map layers divided into groups. However, the present disclosure is not limited thereto.

In operation S220, when a first map layer is selected by a user, the computing device 100 may identify a relationship between first unique identification information corresponding to the first map layer and first unique identification information corresponding to a second map layer on the basis of the relationship information generated in operation S220, and determine whether there is a correlation between the first map layer and the second map layer, i.e., whether the first map layer and the second map layer are of the same, correspond to the same zone or are generated based on the same version of sensor data.

Here, the second map layer may be another map layer selected along with the first map layer by the user, but is not limited thereto and may be at least one of pieces of map data included in high definition map data corresponding to a predetermined area.

That is, when no map layer is included in the high definition map data corresponding to the area and two or more map layers are selected by the user, the computing device 100 may determine whether there is a correlation between two or more map layers. When a map layer is included in the high definition map data corresponding to the area and one map layer is selected by the user, the computing device 100 may determine whether there is a correlation between the map layer included in the high definition map data and the selected map layer. When a map layer is included in the high definition map data corresponding to the area and two or more map layers are selected by the user, the computing device 100 may determine whether there is a correlation between the two or more map layers and whether there is a correlation between the two or more map layers and the map layer included in the high definition map data.

In operation S230, when it is determined in operation S220 that there is a correlation between the first map layer and the second map layer, the computing device 100 may determine that the first map layer is a compatible map layer and add the first map layer to the high definition map data for the area.

In operation S240, when it is determined in operation S220 that there is no correlation between the first map layer and the second map layer, the computing device 100 may determine that the first map layer is an incompatible map layer.

In this case, when it is determined that the first map layer is an incompatible map layer, the computing device 100 may recommend at least one compatible map layer on the basis of an attribute of the map layer included in the high definition map data corresponding to the area.

For example, when information included in the first map layer is road information, the computing device 100 may select at least one map layer related to a map layer included in high definition map data corresponding to a predetermined area among map layers including the road information by comparing first unique identification information corresponding to the map layers including the road information and first unique identification information corresponding to the map layer included in the high definition map data on the basis of the relationship information, and provide a user with the selected at least one map layer as at least one recommended map layer.

Figure 5:
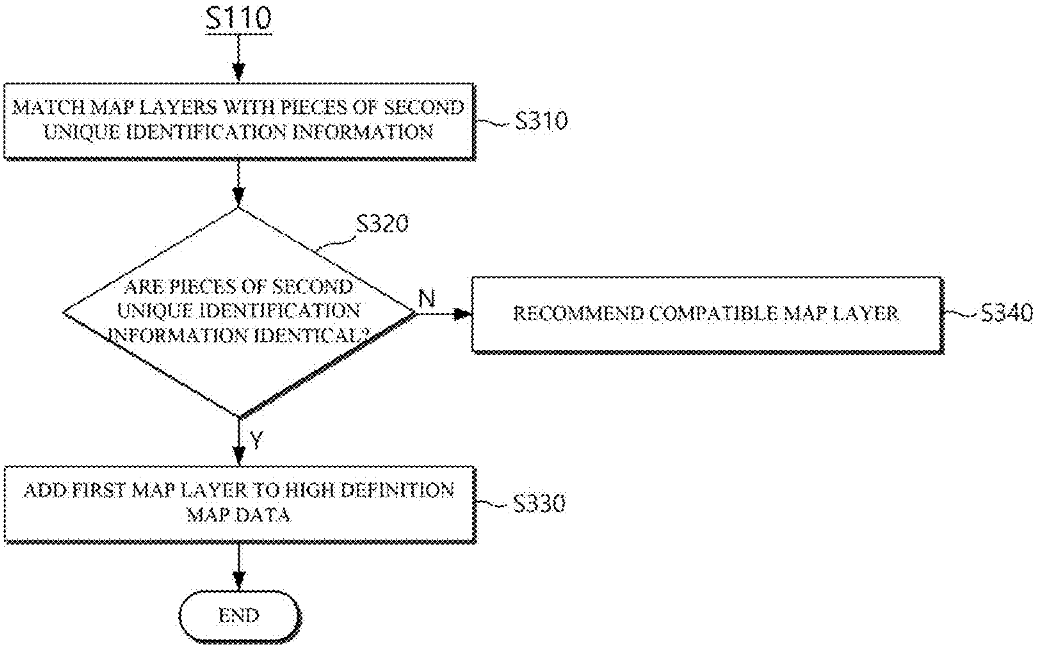
FIG. 5 is a flowchart of a method of verifying the compatibility of a map layer on the basis of a type of sensor data according to various embodiments.

FIG. 5 is a flowchart of a method of verifying the compatibility of a map layer on the basis of a type of sensor data according to various embodiments.

Referring to FIG. 5, in various embodiments, the computing device 100 may verify the compatibility of a map layer selected by a user on the basis of whether the map layer has been generated from the same version of sensor data.

In operation S310, the computing device 100 may match map layers with pieces of second unique identification information.

More specifically, first, the computing device 100 may generate pieces of second unique identification information for pieces of sensor data on the basis of attributes of the pieces of sensor data. For example, the computing device 100 may generate the pieces of second unique identification information for the pieces of sensor data on the basis of at least one of zones in which the pieces of the sensor data have been collected and the versions of the pieces of sensor data (e.g., points in time when the pieces of the sensor data have been collected, the type of a sensor, the types of the pieces of the sensor data, and the like).

Here, the pieces of second unique identification information is unique ID information corresponding to the pieces of sensor data, and may each be, for example, a combination of a code corresponding to the zone in which the corresponding piece of sensor data is collected and a code corresponding to the version of the corresponding piece of sensor data, but embodiments are not limited thereto.

Thereafter, when map layers are generated from the pieces of sensor data, the computing device 100 may mutually match the pieces of second unique identification information corresponding to the pieces of sensor data and the map layers generated from the pieces of sensor data.

In operation S320, when a first map layer is selected for a predetermined area, the computing device 100 may determine whether second unique identification information corresponding to the first map layer is the same as second unique identification information corresponding to a second map layer, i.e., whether the first map layer and the second map layer are generated on the basis of the same version of sensor data.

Here, the second map layer may be another map layer selected along with the first map layer by the user, but is not limited thereto and may be at least one of pieces of map data included in high definition map data corresponding to the area.

In operation S330, when it is determined in operation S320 that the second unique identification information corresponding to the first map layer and the second unique identification information corresponding to the second map layer are the same, the computing device 100 may determine that the first map layer is a compatible map layer and add the first map layer to the high definition map data for the area.

In operation S340, when it is determined in operation S320 that the second unique identification information corresponding to the first map layer and the second unique identification information corresponding to the second map layer are different, the computing device 100 may determine that the first map layer is an incompatible map layer.

In this case, when it is determined that the first map layer is an incompatible map layer, the computing device 100 may recommend at least one compatible map layer on the basis of an attribute of a map layer included in the high definition map data corresponding to the area.

Here, a method of recommending at least one map layer may be the same as or similar to the method of recommending a map layer, which is performed in operation S240 of FIG. 4, but is not limited thereto.

Figure 6:
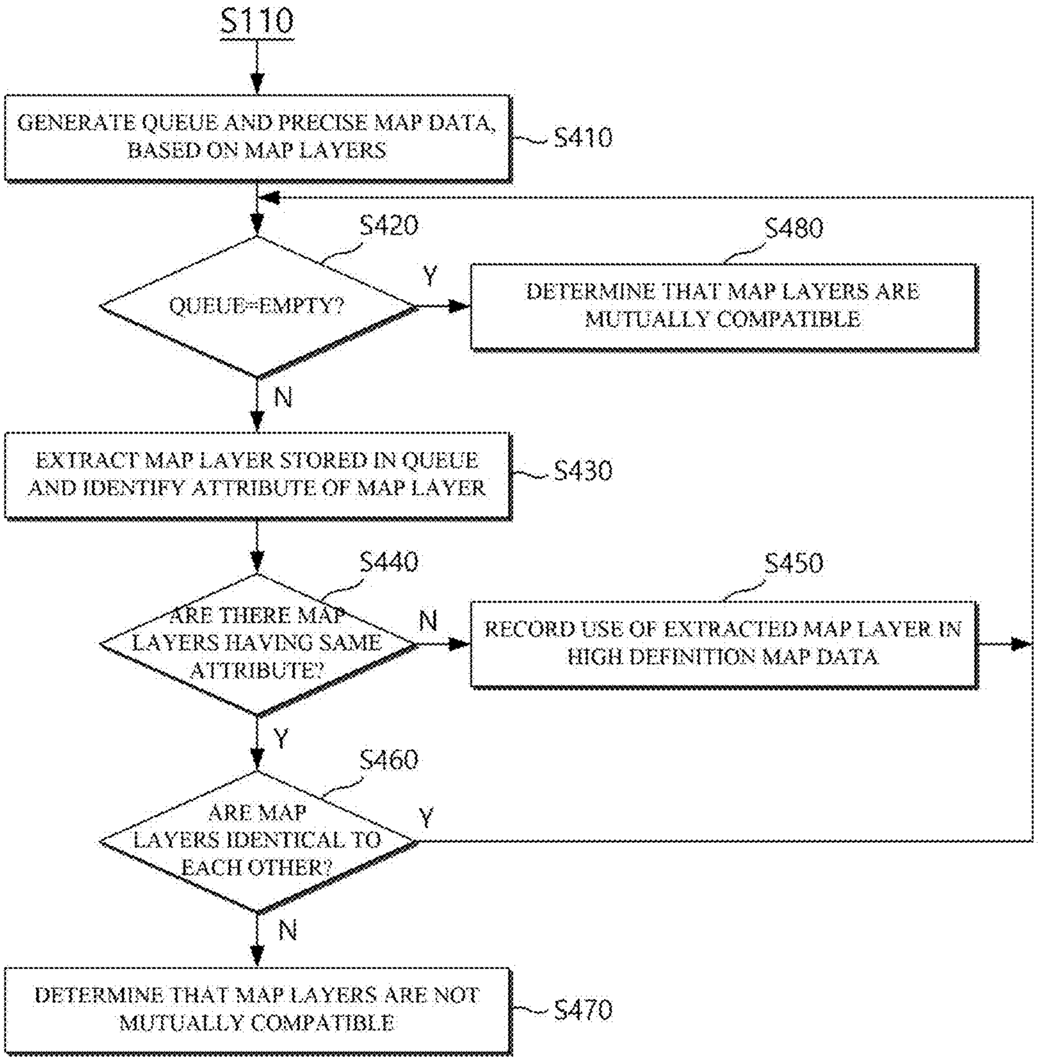
FIG. 6 is a flowchart of a method of verifying the compatibility of a map layer on the basis of a result of determining whether the map layer has been used on the basis of attributes.

FIG. 6 is a flowchart of a method of verifying the compatibility of a map layer on the basis of a result of determining whether the map layer has been used on the basis of attributes.

Referring to FIG. 6, in various embodiments, when map layers for a predetermined area are selected, the computing device 100 may verify the compatibility of the map layers by determining attributes of the map layers (e.g., the type of each of the map layers such as the type of information included in each of the map layers, a zone corresponding to each of the map layers (e.g., zones in which sensor data used to generate the map layers has been collected) and the version of the sensor data (e.g., a point in time when the sensor data used to generate the map layers has been collected, the type of a sensor, the type of sensor data, etc.)) on the basis of the information included in the map layers, and determining whether there are two or more map layers having the same attribute among the map layers on the basis of the determined attributes.

In operation S410, when map layers for a predetermined area are selected, the computing device 100 may generate a queue and one piece of high definition map data. For example, when map layers for the area are selected by a user, the computing device 100 may generate one piece of high definition map data including the map layers and sequentially store the selected map layers in a queue provided in advance to verify the compatibility of the map layers. However, the present disclosure is not limited thereto. In operation S420, the computing device 100 may determine whether the queue is empty.

In operation S430, when the queue is not empty, that is, when at least one map layer is stored in the queue, the computing device 100 may extract (pop) a first map layer from among the at least one map layer stored in the queue and identify an attribute of the first map layer extracted from the queue. For example, the computing device 100 may determine the attribute of the first map layer on the basis of the type of information included in the first map layer extracted from the queue, but embodiments are not limited thereto.

In operation S440, the computing device 100 may determine whether there is another map layer having the same attribute as the first map layer, i.e., a second map layer including the same type of information as the first map layer, using the attribute identified in operation S430 and the high definition map data generated in operation S410. For example, when the first map layer is a map layer including road information, the computing device 100 may determine whether there is a second map layer including the road information among map layers used for the high definition map data.

In operation S450, when it is determined in operation S440 that there is no second map layer having the same attribute as the first map layer, the computing device 100 may record the use of the map layers on the high definition map data. For example, when it is determined that there is no second map layer having the same attribute as the first map layer, the computing device 100 may record the use of the first map layer for a specific attribute on the high definition map data, but embodiments are not limited thereto.

In this case, the computing device 100 may record the use of the first map layer for the attribute, and store an upper map layer for the first map layer in the queue when there is the upper map layer for the first map layer.

Thereafter, the computing device 100 may repeatedly perform operations S420 to S450 until the queue becomes empty, i.e., until there is no map layer stored in the queue.

In operation S460, when it is determined in operation S440 that there is a second map layer having the same attribute as the first map layer, the computing device 100 may determine whether the first map layer and the second map layer are the same map layer.

In operation S470, when it is determined in operation S440 that the first map layer and the second map layer are different map layers, the computing device 100 may determine that the first map layer and the second map layer are not compatible with each other.

Meanwhile, when it is determined in operation S460 that the first map layer and the second map layer are the same map layer, the computing device 100 may determine that the first map layer is compatible, record the use of the first or second map layer on the high definition map data, and generate high definition map data using only the first or second map layer, the use of which is recorded.

Figure 7:
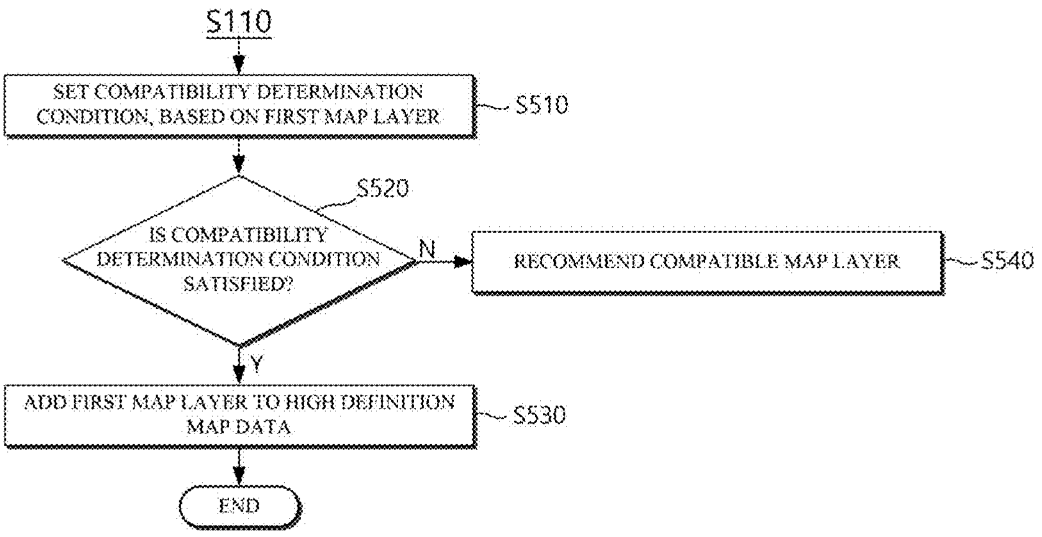
FIG. 7 is a flowchart of a method of verifying the compatibility of a map layer on the basis of whether adjacent zones satisfy a compatibility determination condition according to various embodiments.

In operation S480, when it is determined in operation S420 that there is no map layer stored in the queue, i.e., when it is determined that the queue is empty, the computing device 100 may determine that the map layers are mutually compatible FIG. 7 is a flowchart of a method of verifying the compatibility of a map layer on the basis of whether adjacent zones satisfy a compatibility determination condition according to various embodiments.

Referring to FIG. 7, in various embodiments, the computing device 100 may verify the compatibility of a map layer selected by a user, based on whether map layers included in high definition map data corresponding to each of adjacent zones satisfy the compatibility determination condition. For example, the computing device 100 may verify the compatibility of a first map layer in a first zone on the basis of whether the first map layer in the first zone and a second map layer in a second zone adjacent to the first zone among a plurality of zones satisfy the compatibility determination condition.

In operation S510, when the first map layer in the first zone is selected, the computing device 100 may set the compatibility determination condition on the basis of an attribute of information included in the first map layer.

For example, when the information included in the first map layer is road information, the computing device 100 may set the continuity of the road as the compatibility determination condition. However, the present disclosure is not limited thereto.

As another example, when the information included in the first map layer is traffic light location information, the computing device 100 may set whether a traffic light is duplicated as the compatibility determination condition. However, the present disclosure is not limited thereto.

In operation S520, the computing device 100 may determine whether the first map layer and a second map layer having the same information as the first map layer among second map layers included in high definition map data corresponding to the second zone adjacent to the first zone satisfy the compatibility determination condition.

For example, when the information included in the first map layer is road information, the computing device 100 may select a second map layer including road information from among the second map layers and determine whether the road is continuous at a boundary between the first zone and the second zone on the basis of the road information included in the selected second map layer and the road information included in the first map layer to determine whether the first map layer and the second map layer satisfy the compatibility determination condition.

As another example, when the information included in the first map layer is traffic light location information, the computing device 100 may select a second map layer including traffic light location information from among the second map layers and determine whether the same traffic light is duplicated in the vicinity of a boundary between the first zone and the second zone on the basis of the traffic light location information included in the selected second map layer and the traffic light location information included in the first map layer to determine whether the first map layer and the second map layer satisfy the compatibility determination condition.

In operation S530, when it is determined in operation S520 that the first map layer and the second map layer satisfy the compatibility determination condition, the computing device 100 may determine that the first map layer is a compatible map layer and add the first map layer to the high definition map data corresponding to the first zone.

For example, when the information included in the first map layer is road information, the computing device 100 may determine that the first map layer is a compatible map layer when it is determined that the road is continuous at the boundary between the first and second zones.

As another example, when the information included in the first map layer is traffic light location information, the computing device 100 may determine that the first map layer is a compatible map layer when it is determined that the same traffic light is not duplicated in the vicinity of the boundary between the first and second zones.

In operation S540, when it is determined in operation S520 that the first map layer and the second map layer do not satisfy the compatibility determination condition, the computing device 100 may determine that the first map layer is an incompatible map layer and recommend at least one map layer on the basis of the compatibility determination condition.

For example, when the information included in the first map layer is road information, the computing device 100 may determine that the first map layer is an incompatible map layer when it is determined that the road is not continuous at the boundary between the first and second zones. Thereafter, the computing device 100 may select at least one map layer satisfying the compatibility determination condition with the second map layer among map layers including road information, and provide a user with the selected at least one map layer as at least one recommended map layer. Here, the map layers including the road information may be, but are not limited to, map layers determined to be compatible with map layers including road information and included in high definition map data corresponding to the first zone among map layers generated in advance.

As another example, when the information included in the first map layer is traffic light location information, the computing device 100 may determine that the first map layer is an incompatible map layer when it is determined that the same traffic light is duplicated in the vicinity of the boundary between the first and second zones. Thereafter, the computing device 100 may select at least one map layer satisfying the compatibility determination condition with the second map layer among map layers including traffic light location information, and provide a user with the selected at least one map layer as at least one recommended map layer. Here, the map layers including the traffic light location information may be, but are not limited to, map layers determined to be compatible with map layers including traffic light location information and included in the high definition map data corresponding to the first zone among map layers generated in advance.

The method of generating a high definition map for autonomous driving control of a vehicle has been described above with reference to the flowcharts shown in the drawings. For a brief description, the method of generating a high definition map for autonomous driving control of a vehicle has been described above using a series of blocks, but the present disclosure is not limited to the order of the blocks and some of the blocks may be performed in an order different from that shown and described herein or substantially simultaneously. In addition, the method may be performed in a state in which a new block that is not described in the present specification and the drawing is added or some blocks are deleted or changed. A high definition map generation service provided by the computing device 100 will be described with reference to FIGS. 9 to 14 below.

FIGS. 9 to 14 are diagrams illustrating examples of a user interface (UI) applicable to various embodiments.

Referring to FIGS. 9 to 14, the computing device 100 may provide UIs 20 and for providing a high definition map generation service.

Figure 9:
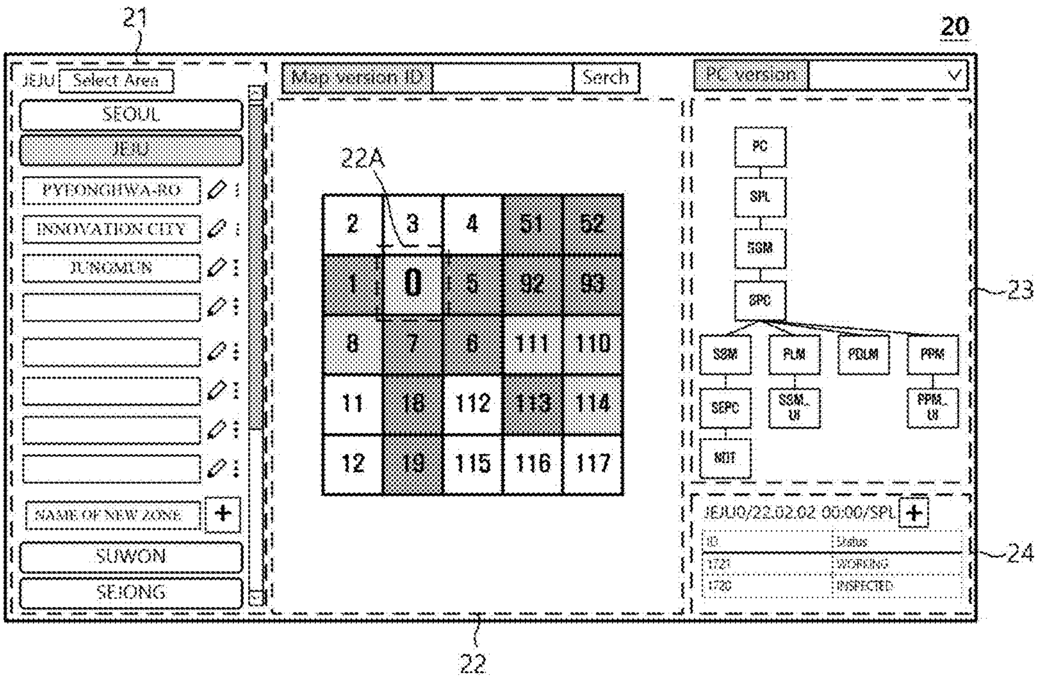
Figure 10:
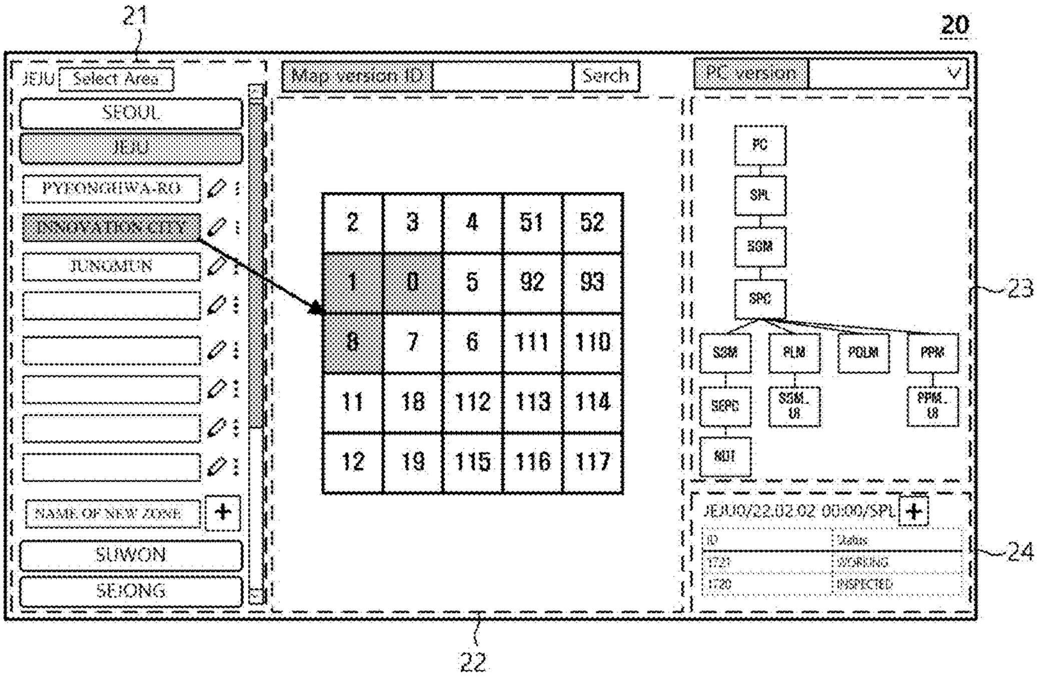

First, referring to FIGS. 9 and 10, the computing device 100 may provide a first UI 20 for providing information about a build status of high definition map data corresponding to a predetermined area.

The first UI 20 may include, but is not limited thereto, an area selection field 21 that outputs information about areas and provides an environment for selecting a predetermined area, a high definition map status display field 22 that outputs information about zones of the area and the build status of pieces of high definition map data corresponding to the zones, a map layer display field 23 that outputs information about map layers included in the high definition map data corresponding to the zones, and a map layer information display field 24 that displays information about the map layers.

The area selection field 21 may output information about areas selectable by a user and provide an environment in which the user may select a predetermined area. The area selection field 21 may also provide an environment for categorizing one or more zones into groups and output the names (e.g., Pyeonghwa-ro, Innovation City, Jungmun, etc.) of the groups of zones. For example, an area may be selected through the area selection field 21, one or more zones may be selected from among zones of the selected area through the high definition map status display field 22, and the selected one or more zones may be categorized into groups. When a certain group is selected through the area selection field 21, a grid corresponding to one or more zones of the selected group may be highlighted and displayed on the high definition map status display field 22.

The high definition map status display field 22 may display information about zones of an area and a high definition map build status of each of the zones. An area may be divided into zones, and zones of an area selected through the area selection field 21 may be displayed, for example, in a grid map form through the high definition map status display field 22 and ID information about the zones may be displayed on grids corresponding to the zones.

In addition, whether autonomous driving is possible for each of the zones may be determined according to a high definition map data build situation of each of the zones, and an attribute of a grid corresponding to each of the zones may be determined and displayed according to whether autonomous driving is possible. For example, a grid corresponding to a zone for which autonomous driving is determined to be possible (a zone for which high definition map data has been built) among the zones may be displayed in green, a grid corresponding to a zone for which a minimum level of autonomous driving is determined to be possible (a zone for high definition map data which is being built) may be displayed in yellow, and a grid corresponding to a zone for which autonomous driving is determined to be not possible (a zone for which high definition map data is not built) may be displayed in red. A zone for which building of high definition map data is not set may be displayed in gray, but embodiments are not limited thereto.

As shown in FIG. 9, when an area 22A is selected through the high definition map status display field 22, a grid corresponding to the area 22A may be highlighted (e.g., by increasing the size of information included in the grid (e.g., ID information of the zone 22A) or changing the color of the edges of the grid) and displayed through the high definition map status display field 22.

In addition, as shown in FIG. 10, when a group is selected through the area selection field 21, in the high definition map status display field 22, only the color of grids included in the selected group may be maintained and the color of the grids of the other non-selected groups may be changed to a preset color (e.g., black) and displayed. However, the present disclosure is not limited thereto, and the grids included in the selected group may be highlighted in various forms (e.g., by increasing the size of the grids or changing the color of the edges of the grids).

The map layer display field 23 may display the types of map layers (e.g., map layers PC, SPL, SGM, SPC, SSM, PLM, PDLM, PPM, SEPC, SSM_UI, PM_UI, NDT, etc.) included in high definition map data corresponding to a specific area (an area selected by a user) and a hierarchical relationship between the map layers. In this case, attributes of the map layers output through the map layer display field 23 may be differently determined according to a work status. For example, among the map layers, a currently working map layer (working) may be displayed in red, a map layer whose inspection is completed (inspected) may be displayed in yellow, and a map layer that has been distributed (released) may be displayed in green, but embodiments are not limited thereto.

The map layer information display field 24 may display information about a map layer selected through the map layer display field 23. For example, when the map layer SPL is selected from among the map layers through the map layer display field 23, the work status of the map layer SPL and ID information in each work status may be displayed.

Next, referring to FIGS. 11 to 14, the computing device 100 may provide a second UI 30 that provides an environment for building high definition map data corresponding to a predetermined area.

First, referring to FIGS. 11 and 12, the second UI 30 may provide an environment in which a user may actually manage a task of manufacturing high definition map data. For example, the second UI 30 may provide a task management field for creating and modifying a task or assigning the task to a worker.

The task management field may display, in a table form, a list of tasks, areas in which the tasks are performed, the types of maps, and information about workers assigned to the tasks. When a task creation button is selected or a task is selected from the list of tasks through the task management field, a task creation and modification field may be output to allow the selected task to proceed.

Here, the task creation and modification field may be implemented in a form (e.g., the form of FIG. 12A) in which a parent map layer and detailed requirements of a task may be written, as well as a task area and the type of map to work on, or may be implemented in a form (e.g., the form of FIG. 12B) in which a task detail field displaying a record of the task is output.

Figure 13:
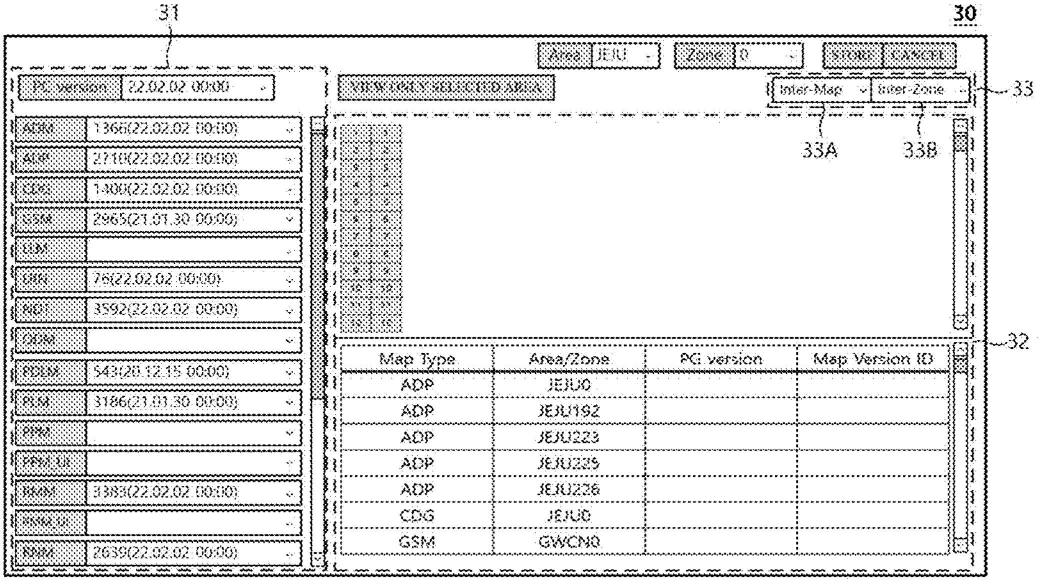
Figure 14:
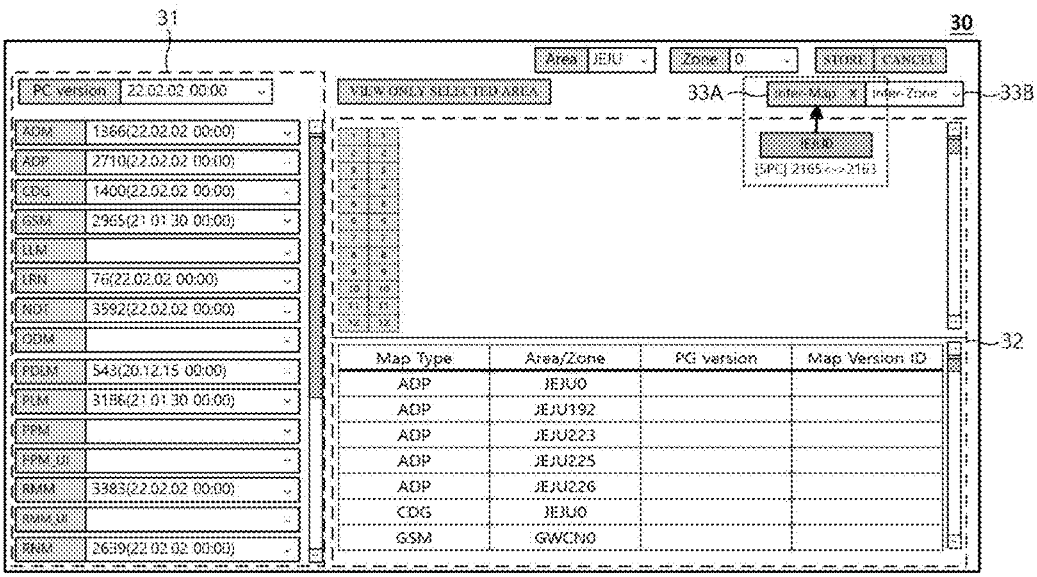

Next, referring to FIGS. 13 and 14, the second UI 30 may include a map layer selection field 31 that outputs information about map layers, a high definition map information field 32 that outputs information about high definition map data corresponding to each of zones of a predetermined area, and a compatibility display field 33 that displays a result of verifying the compatibility between the map layers and a result of verifying the compatibility between the zones.

In the map layer selection field 31, information about selectable map layers (e.g., the types and IDs of the selectable map layers, ID of sensor data corresponding to each of the selectable map layers, etc.) may be displayed to select map layers of the high definition map data, and high definition map data including map layers selected by a user may be output.

The high definition map information field 32 may display information about the map layers of the high definition map data (e.g., the types of map layers, areas, zones, the version of sensor data, the ID of the high definition map data, etc.), and code information of the high definition map data.

The compatibility display field 33 may display a result of verifying the compatibility between the map layers selected by the user. Here, the compatibility between the map layers may include the compatibility between a map layer selected by a user to correspond to a specific zone and map layers set in advance for the specific zone (e.g., the compatibility between map layers) and the compatibility between a map layer selected to correspond to the specific zone and map layers of another zone adjacent to the specific zone (e.g., the compatibility between zones), and thus, the compatibility display field 33 may include an inter-map layer compatibility display field 33A displaying a result of verifying the compatibility between map layers and an inter-zone compatibility display field 33B displaying a result of verifying the compatibility between zones.

A compatibility verification operation may be performed whenever a map layer is selected by a user, and a compatibility verification result may be immediately output through the compatibility display field 33. In this case, when a map layer is determined to be incompatible and a recommended map layer is thus selected, information about the selected recommended map layer may be displayed together with a compatibility verification result. For example, referring to FIG. 14, the compatibility display field 33 may display a compatibility verification result when compatibility between map layers is not possible, but compatibility between zones is possible, and displays information about a recommended map layer for compatibility (e.g., information about a recommendation to switch between a map layer SPC 2165 and a map layer SPC 2163).

According to various embodiments of the present disclosure, an environment in which a user can generate high definition map data for a predetermined area more conveniently and a function of verifying the compatibility of a map layer selected by the user are provided to prevent human errors such as use of map layers generated from different versions of sensor data, thereby enabling the generation of more accurate high definition map data.

Effects of the present disclosure are not limited thereto and other effects that are not described herein will be apparent to those of ordinary skill in the art from the above detailed description.

While embodiments of the present disclosure have been described above with reference to the accompanying drawings, it will be obvious to those of ordinary skill in the art that the present disclosure may be embodied in many different forms without departing from the technical spirit or essential features thereof. Therefore, it should be understood that the embodiments described above are illustrative in all aspects and not restrictive.

What is claimed is:

1. A method of generating a high definition map for autonomous driving control of a vehicle, which is performed by a computing device, the method comprising:

selecting one or more map layers for a predetermined area; and generating high definition map data corresponding to the predetermined area using the selected one or more map layers, wherein the generating of the high definition map data comprises verifying compatibility of the selected one or more map layers, wherein the verifying of the compatibility of the selected one or more map layers comprises:

when a plurality of map layers are selected for the predetermined area, determining attributes of the selected plurality of map layers on the basis of information included in the selected plurality of map layers;

determining whether there are two or more map layers having the same attribute among the selected plurality of map layers, based on the determined attributes; and determining the selected plurality of map layers to be mutually compatible when it is determined that there are no two or more map layers having the same attribute among the selected plurality of map layers or that the two or more map layers determined to have the same attribute are identical to each other, and determining the selected map layers to be mutually incompatible when the two or more map layers determined to have the same attribute are different map layers, wherein the verifying of the compatibility of the selected one or more map layers further comprises:

when it is determined that the selected one or more map layers are determined to be compatible map layers, adding the selected one or more map layers to high definition map data for the predetermined area, and showing a compatibility display field indicating compatibility of the selected one or more map layers; and when it is determined that the selected one or more map layers are determined to be incompatible map layers, displaying a recommended map layer and the compatibility display field indicating incompatibility of the selected one or more map layers, wherein the recommended map layer is different from the selected one or more map layers, is generated prior to a selection of the selected one or more map layers, and is determined to be compatible on the basis of an attribute of the recommended map layer, wherein the attributes of the selected plurality of map layers comprises:

type information indicating kinds of data contained in each of the selected plurality of map layers;

region information indicating areas from which sensor data used to generate the selected plurality of map layers were collected; and version information indicating types of sensors and the sensor data used to generate the selected plurality of map layers were collected, and wherein the verifying of the compatibility of the selected one or more map layers is performed whenever a map layer is selected by the computing device based on a user input, for the high definition map data.

2. The method of claim 1, wherein the verifying of the compatibility of the selected one or more map layers comprises:

generating a plurality of pieces of first unique identification information corresponding to a plurality of previously generated map layers on the basis of attributes of the plurality of previously generated map layers, and generating relationship information between the generated plurality of pieces of first unique identification information on the basis of a correlation between the plurality of previously generated map layers; and when a first map layer is selected for the predetermined area, determining a relationship between first unique identification information of the selected first map layer and first unique identification information of a second map layer on the basis of the generated relationship information, and determining compatibility between the selected first map layer and the second map layer on the basis of the determined relationship, wherein the second map layer is a map layer selected together with the first map layer or a map layer included in high definition map data corresponding to the predetermined area.

3. The method of claim 1, wherein the verifying of the compatibility of the selected one or more map layers comprises:

generating a plurality of pieces of second unique identification information corresponding to a plurality of pieces of sensor data on the basis of attributes of the plurality of pieces of sensor data, and matching the generated plurality of pieces of second unique identification information and a plurality of map layers generated from the plurality of pieces of sensor data; and when a first map layer is selected for the predetermined area, comparing second unique identification information of the selected first map layer with second unique identification information of a second map layer to determine compatibility between the selected first map layer and the second map layer, wherein the second map layer is a map layer selected together with the first map layer or a map layer included in high definition map data corresponding to the predetermined area.

4. The method of claim 1, wherein the predetermined area comprises a first zone and a second zone adjacent to the first zone, and the verifying of the compatibility of the selected one or more map layers comprises, when a first map layer is selected for the first zone, setting a compatibility determination condition on the basis of an attribute of information included in the selected first map layer, and determining whether the selected first map layer and a second map layer satisfy the set compatibility determination condition, wherein the second map layer comprises the same information as the information included in the selected first map layer among a plurality of second map layers included in high definition map data corresponding to the second zone.

5. The method of claim 4, wherein the determining of whether the selected first map layer and the second map layer satisfy the set compatibility determination condition comprises:

setting road continuity as the compatibility determination condition when the selected first map layer includes road information;

determining whether a road is continuous at a boundary between the first zone and the second zone on the basis of the road information included in the selected first map layer and road information included in the second map layer; and determining the first map layer to be a compatible map layer when it is determined that the road is continuous at the boundary between the first and second zones, and determining the first map layer to be an incompatible map layer when it is determined that the road is not continuous at the boundary between the first and second zones.

6. The method of claim 4, wherein the determining of whether the first map layer and the second map layer satisfy the set compatibility determination condition comprises:

setting whether a traffic light is duplicated as the compatibility determination condition when the selected first map layer includes traffic light location information;

determining whether the same traffic light is present in the first and second zones on the basis of the traffic light location information included in the selected first map layer and traffic light location information included in the second map layer; and determining the first map layer to be a compatible map layer when it is determined that the same traffic light is not present in the first and second zones, and determining the first map layer to be an incompatible map layer when it is determined that the same traffic light is present in the first and second zones.

7. The method of claim 1, wherein the selecting of the one or more map layers comprises:

providing a user interface (UI); and selecting one or more map layers from among the plurality of map layers through the provided UI, wherein the plurality of map layers are generated by post-processing a plurality of pieces of sensor data collected in correspondence with the predetermined area, wherein the provided UI comprises a first UI providing information about a build status of high definition map data corresponding to the predetermined area, and a second UI providing a build environment of the high definition map data corresponding to the predetermined area.

8. The method of claim 7, wherein the first UI comprises:

an area selection field for outputting information about the predetermined area;

a high definition map status display field for outputting a build status of high definition map data corresponding to each of a plurality of zones of the predetermined area; and a map layer display field for outputting information about map layers included in the high definition map data corresponding to each of the plurality of zones, and the providing of the UI comprises, when one of the plurality of zones is selected through the high definition map status display field, highlighting the zone selected from among the plurality of zones output to the high definition map status display field, and outputting information about map layers included in high definition map data corresponding to the selected zone through the map layer display field.

9. The method of claim 7, wherein the second UI comprises:

a map layer selection field for outputting information about the plurality of map layers;

a high definition map information field for outputting information about high definition map data corresponding to each of a plurality of zones of the predetermined area; and a compatibility display field for displaying a result of verifying compatibility between map layers, and the providing of the UI comprises, when at least one map layer is selected from among the plurality of map layers through the map layer selection field, adding the selected at least one map layer to the high definition map data, outputting the high definition map data added the selected at least one map layer through the high definition map information field, verifying compatibility of the selected at least one map layer, and outputting a result of verifying the compatibility of the selected at least one map layer through the compatibility display field.

10. The method of claim 7, further comprising generating a plurality of map layers for the predetermined area, wherein the generating of the plurality of map layers comprises:

generating an upper map layer for the predetermined area on the basis of a user input; and automatically generating one or more lower map layers for the generated upper map layer according to a predefined rule using the generated upper map layer.

11. A computing device for performing a method of generating a high definition map for autonomous driving control of a vehicle, the computing device comprising:

a processor;

a network interface;

a memory; and a computer program that is loaded in the memory and is executable by the processor, wherein the computer program comprises:

an instruction for selecting one or more map layers for a predetermined area; and an instruction for generating high definition map data corresponding to the predetermined area using the selected one or more map layers, wherein the instruction for generating the high definition map data comprises an instruction for verifying compatibility of the selected one or more map layers, wherein the verifying of the compatibility of the selected one or more map layers comprises:

when a plurality of map layers are selected for the predetermined area, determining attributes of the selected plurality of map layers on the basis of information included in the selected plurality of map layers;

determining whether there are two or more map layers having the same attribute among the selected plurality of map layers, based on the determined attributes; and determining the selected plurality of map layers to be mutually compatible when it is determined that there are no two or more map layers having the same attribute among the selected plurality of map layers or that the two or more map layers determined to have the same attribute are identical to each other, and determining the selected map layers to be mutually incompatible when the two or more map layers determined to have the same attribute are different map layers, wherein the verifying of the compatibility of the selected one or more map layers further comprises:

when it is determined that the selected one or more map layers are determined to be compatible map layers, adding the selected one or more map layers to high definition map data for the predetermined area, and showing a compatibility display field indicating compatibility of the selected one or more map layers; and when it is determined that the selected one or more map layers are determined to be incompatible map layers, displaying a recommended map layer and the compatibility display field indicating incompatibility of the selected one or more map layers, wherein the recommended map layer is different from the selected one or more map layers, is generated prior to a selection of the selected one or more map layers, and is determined to be compatible on the basis of the recommended map layer, wherein the attributes of the selected plurality of map layers comprises:

type information indicating kinds of data contained in each of the selected plurality of map layers;

region information indicating areas from which sensor data used to generate the selected plurality of map layers were collected; and version information including types of sensors and the sensor data used to generate the selected plurality of map layers were collected, and wherein the verifying of the compatibility of the selected one or more map layers is performed whenever a map layer is selected by the computing device based on a user input, for the high definition map data.

12. A non-transitory computer-readable recording medium on which a program for executing a method of generating a high definition map for autonomous driving control of a vehicle in conjunction with a computing device is recorded, wherein the method comprises:

selecting one or more map layers for a predetermined area; and generating high definition map data corresponding to the predetermined area using the selected one or more map layers, wherein the generating of the high definition map data comprises verifying compatibility of the selected one or more map layers, wherein the verifying of the compatibility of the selected one or more map layers comprises:

when a plurality of map layers are selected for the predetermined area, determining attributes of the selected plurality of map layers on the basis of information included in the selected plurality of map layers;

determining whether there are two or more map layers having the same attribute among the selected plurality of map layers, based on the determined attributes; and determining the selected plurality of map layers to be mutually compatible when it is determined that there are no two or more map layers having the same attribute among the selected plurality of map layers or that the two or more map layers determined to have the same attribute are identical to each other, and determining the selected map layers to be mutually incompatible when the two or more map layers determined to have the same attribute are different map layers, wherein the verifying of the compatibility of the selected one or more map layers further comprises:

when it is determined that the selected one or more map layers are determined to be compatible map layers, adding the selected one or more map layers to high definition map data for the predetermined area, and showing a compatibility display field indicating compatibility of the selected one or more map layers; and when it is determined that the selected one or more map layers are determined to be incompatible map layers, displaying a recommended map layer and the compatibility display field indicating incompatibility of the selected one or more map layers, wherein the recommended map layer is different from the selected one or more map layers, is generated prior to a selection of the selected one or more map layers, and is determined to be compatible on the basis of an attribute of the recommended map layer, wherein the attributes of the selected plurality of map layers comprises:

type information indicating kinds of data contained in each of the selected plurality of map layers;

region information indicating areas from which sensor data used to generate the selected plurality of map layers were collected; and version information indicating types of sensors and the sensor data used to generate the selected plurality of map layers were collected, and wherein the verifying of the compatibility of the selected one or more map layers is performed whenever a map layer is selected by the computing device based on a user input, for the high definition map data.

* * * * *